(12) United States Patent
Tessarolo

(10) Patent No.: US 9,249,989 B2
(45) Date of Patent: Feb. 2, 2016

(54) SOLAR RADIATOR

(76) Inventor: Ferdinando Tessarolo, Quito (EC)

( * ) Notice: Subject to any disclaimer, the term of this patent is extended or adjusted under 35 U.S.C. 154(b) by 1161 days.

(21) Appl. No.: 12/089,605

(22) PCT Filed: Oct. 6, 2006

(86) PCT No.: PCT/EP2006/067154
§ 371 (c)(1),
(2), (4) Date: Apr. 9, 2008

(87) PCT Pub. No.: WO2007/042481
PCT Pub. Date: Apr. 19, 2007

(65) Prior Publication Data
US 2008/0251066 A1 Oct. 16, 2008

(30) Foreign Application Priority Data

Oct. 12, 2005 (IT) ................................ VI2005A0269
Nov. 7, 2005 (IT) ................................ VI2005A0293

(51) Int. Cl.
*F24J 2/00* (2014.01)
*F24J 2/04* (2006.01)
*A01G 15/00* (2006.01)

(52) U.S. Cl.
CPC ............... *F24J 2/0427* (2013.01); *A01G 15/00* (2013.01); *Y02B 10/20* (2013.01); *Y02E 10/44* (2013.01)

(58) Field of Classification Search
CPC ... A01G 15/00; A01G 9/243; A01G 13/0212; A01G 13/206; F24J 2/0427
USPC .................. 126/569, 714, 701, 634; 239/2.1; 47/1.01 R, 29.1, 30, 32.3, 17, 20.1, 47/29.3, 29.2; 454/900; 417/207, 909; 256/1, 12.5, 23, 24; 60/641.12, 698
See application file for complete search history.

(56) References Cited

U.S. PATENT DOCUMENTS

| | | | | |
|---|---|---|---|---|
| 98,892 A | * | 1/1870 | Sprague | 47/31 |
| 246,626 A | * | 9/1881 | Morse | 126/628 |
| 1,926,053 A | * | 9/1933 | Morgan | 47/31 |
| 2,015,471 A | * | 9/1935 | Genuit | 47/23.1 |
| 2,039,522 A | * | 5/1936 | De Land | 47/2 |
| 2,157,502 A | * | 5/1939 | Slade | 47/29.3 |
| 2,268,320 A | * | 12/1941 | Brandt | 244/114 R |
| 2,416,037 A | * | 2/1947 | Mead | 52/63 |
| 2,559,871 A | * | 7/1951 | Gay | 237/1 R |

(Continued)

FOREIGN PATENT DOCUMENTS

| | | | | |
|---|---|---|---|---|
| DE | 4132916 A1 | * | 4/1993 | B01D 5/00 |
| EP | 1741927 A1 | * | 1/2007 | F03D 1/04 |

(Continued)

*Primary Examiner* — Avinash Savani
*Assistant Examiner* — Aaron Heyamoto
(74) *Attorney, Agent, or Firm* — Jeffrey Furr, Esq.; Furr Law Firm

(57) ABSTRACT

A solar radiator is a structure producing two cross shades in corridors, it dissipates solar energy for protecting corridors from excess of solar energy, the average temperature on the soil in the corridors slows down considerably therefore there is a decrease of the evaporation of moister in such corridors, the solar radiator is suitable to produce at least two cross protective shades in the same corridor and is suitable to collect, transmit and dissipate passively, without causing pollution or using other power, at least part of the energy of the solar radiation that strikes its panels. The solar radiator is designed to protect corridors, crops and plants against excessive solar radiation and moister evaporation.

17 Claims, 7 Drawing Sheets

(56) References Cited

U.S. PATENT DOCUMENTS

| | | | | |
|---|---|---|---|---|
| 2,601,905 A * | 7/1952 | Anderegg | | 96/144 |
| 2,777,253 A * | 1/1957 | Bensin | | 47/1.01 R |
| 2,784,528 A * | 3/1957 | Rudenauer | | 47/48.5 |
| 3,102,532 A * | 9/1963 | Shoemaker | | 126/649 |
| 3,103,764 A * | 9/1963 | Heuer | | 47/22.1 |
| 3,129,793 A * | 4/1964 | Ferrell | | 52/73 |
| 3,220,065 A * | 11/1965 | Graham | | 49/67 |
| 3,243,890 A * | 4/1966 | Easterday | | 34/498 |
| 3,272,435 A * | 9/1966 | Brownell, Jr. | | 239/14.1 |
| 3,436,908 A * | 4/1969 | Van Delic | | 126/634 |
| 3,537,688 A * | 11/1970 | Stein | | 135/95 |
| 3,666,176 A * | 5/1972 | Carter, Jr. | | 239/2.1 |
| 3,741,631 A * | 6/1973 | Laing | | 359/228 |
| 3,809,051 A * | 5/1974 | Giroux | | 126/9 R |
| 3,812,616 A * | 5/1974 | Koziol | | 52/63 |
| 3,828,473 A * | 8/1974 | Morey | | 47/58.1 R |
| 3,863,621 A * | 2/1975 | Schoenfelder | | 126/633 |
| 3,932,958 A * | 1/1976 | Kistler et al. | | 47/22.1 |
| 3,990,635 A * | 11/1976 | Restle et al. | | 126/591 |
| 4,020,826 A * | 5/1977 | Mole | | 126/628 |
| 4,068,652 A * | 1/1978 | Worthington | | 126/603 |
| 4,072,142 A * | 2/1978 | Lof | | 126/675 |
| 4,073,282 A * | 2/1978 | Schriefer, Jr. | | 126/648 |
| 4,112,918 A * | 9/1978 | Palkes | | 126/596 |
| 4,155,346 A * | 5/1979 | Aresty | | 126/652 |
| 4,198,796 A * | 4/1980 | Foster | | 52/203 |
| 4,211,213 A * | 7/1980 | Nissen et al. | | 126/563 |
| 4,223,666 A * | 9/1980 | Wasserman | | 126/618 |
| 4,250,801 A * | 2/1981 | Boidron | | 126/539 |
| 4,280,477 A * | 7/1981 | Divine | | 126/563 |
| 4,287,683 A * | 9/1981 | Louwenaar | | 49/463 |
| 4,381,763 A * | 5/1983 | Kahl | | 126/563 |
| 4,399,805 A * | 8/1983 | Kienlen et al. | | 126/201 |
| 4,416,255 A * | 11/1983 | Secamiglio et al. | | 126/631 |
| 4,489,706 A * | 12/1984 | Hait | | 126/9 R |
| 4,498,262 A * | 2/1985 | Garcia | | 52/3 |
| 4,544,587 A * | 10/1985 | Nesbitt | | 428/34 |
| 4,679,609 A * | 7/1987 | Bateman | | 160/124 |
| 4,852,194 A * | 8/1989 | Langan | | 5/427 |
| 4,966,181 A * | 10/1990 | Liberman et al. | | 135/87 |
| 4,971,028 A * | 11/1990 | Fagan | | 126/633 |
| 5,083,396 A * | 1/1992 | Traut | | 47/22.1 |
| 5,361,535 A * | 11/1994 | Morasiewicz | | 47/30 |
| 5,609,176 A * | 3/1997 | Weeks | | 135/96 |
| 5,865,355 A * | 2/1999 | Camara | | 224/153 |
| D410,289 S * | 5/1999 | Howard et al. | | D25/38 |
| 6,161,362 A * | 12/2000 | Forbis et al. | | 52/745.06 |
| 6,672,366 B1 * | 1/2004 | Wade et al. | | 160/371 |
| 6,899,098 B2 * | 5/2005 | Durbin | | 126/629 |
| 2004/0253456 A1 * | 12/2004 | Braybrook | | 428/441 |
| 2005/0061311 A1 * | 3/2005 | Christensen | | 126/629 |
| 2005/0155284 A1 * | 7/2005 | Kulas | | 47/31 |

FOREIGN PATENT DOCUMENTS

| | | | |
|---|---|---|---|
| FR | 2564880 A1 * | 11/1985 | |
| GB | 2089872 A * | 6/1982 | E06B 9/52 |
| GB | 2228312 A * | 8/1990 | F24F 13/02 |
| JP | 55089650 A * | 7/1980 | F24J 3/02 |
| JP | 56110839 A * | 9/1981 | F24J 3/02 |
| JP | 2003301618 A * | 10/2003 | E04H 1/02 |
| JP | 2004011159 A * | 1/2004 | E01C 1/00 |
| WO | WO 9738570 A1 * | 10/1997 | A01G 15/00 |

* cited by examiner

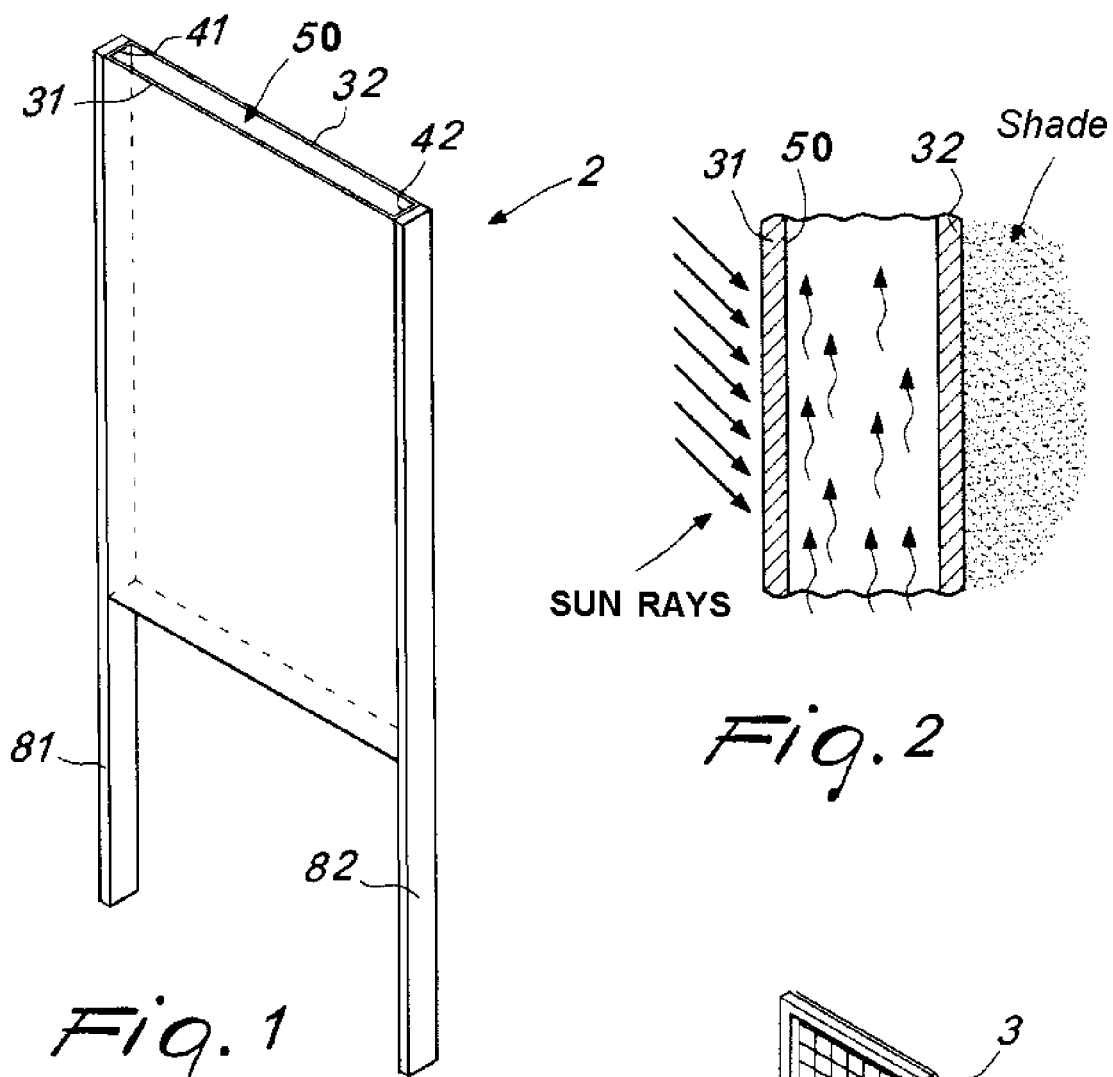
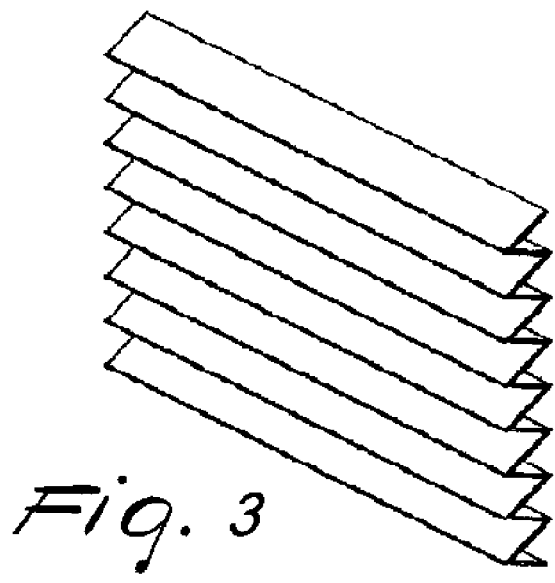
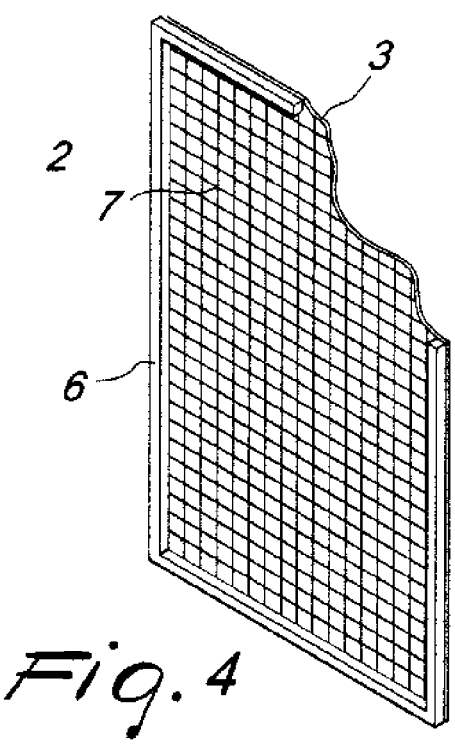

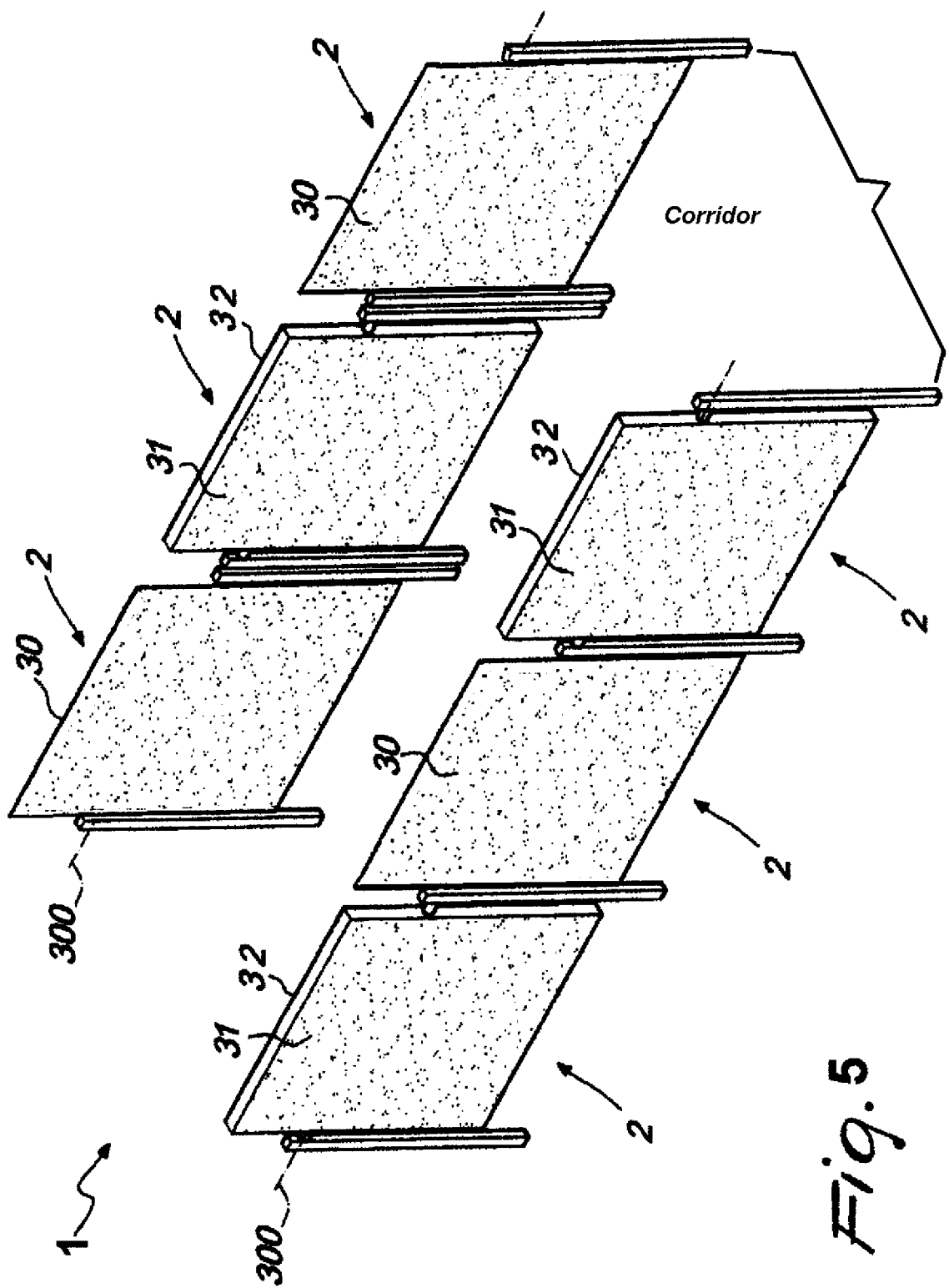

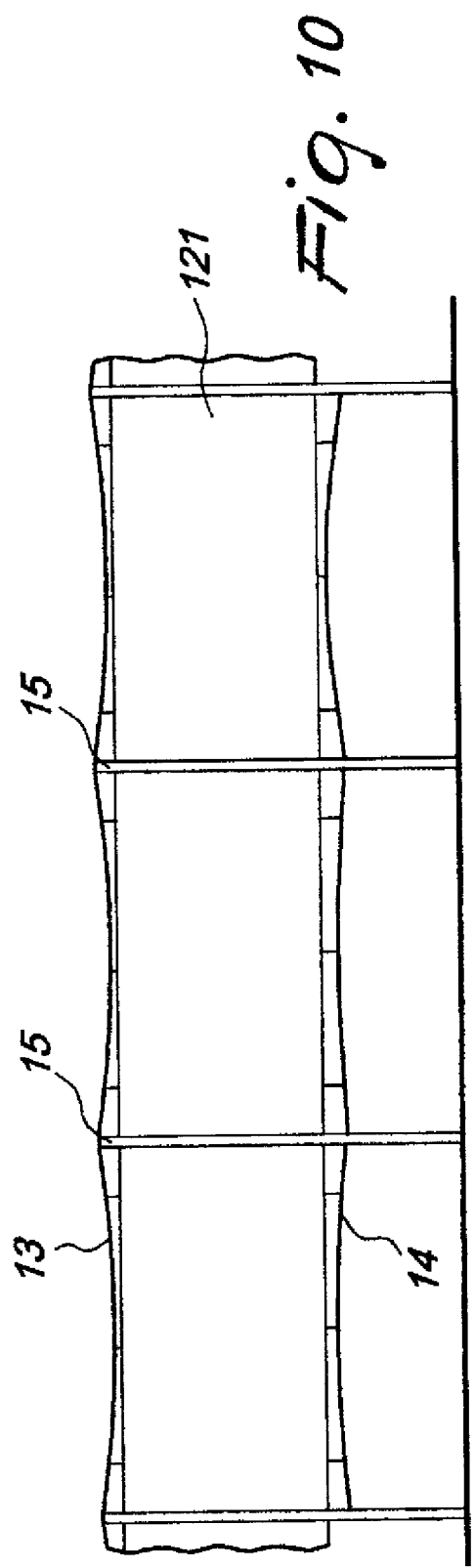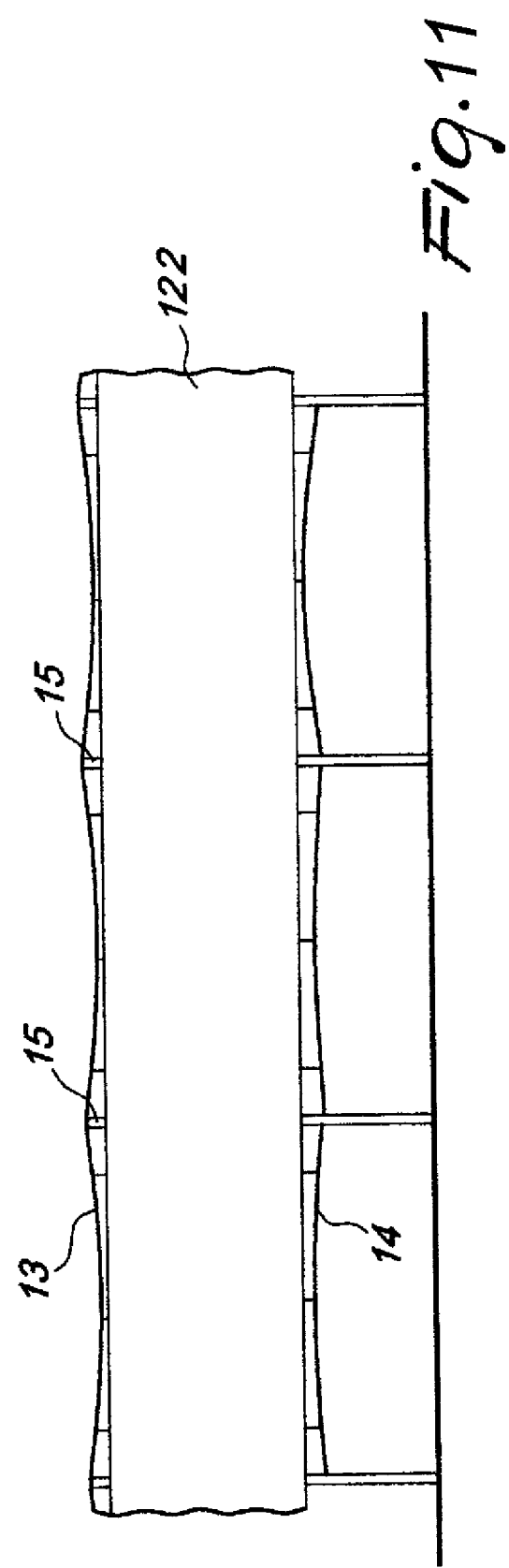

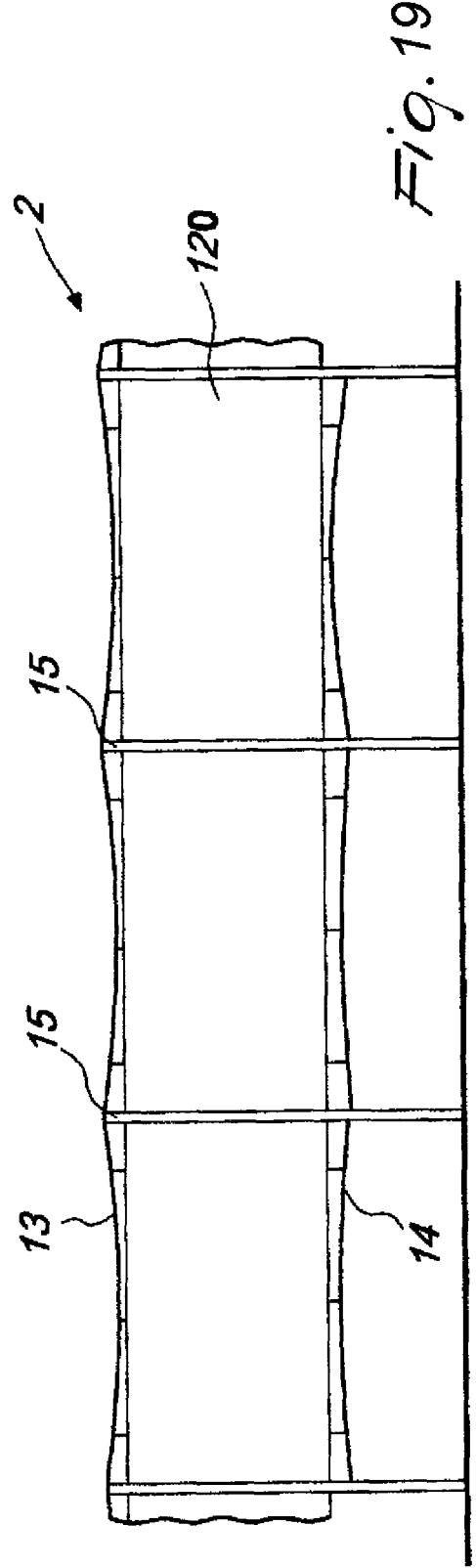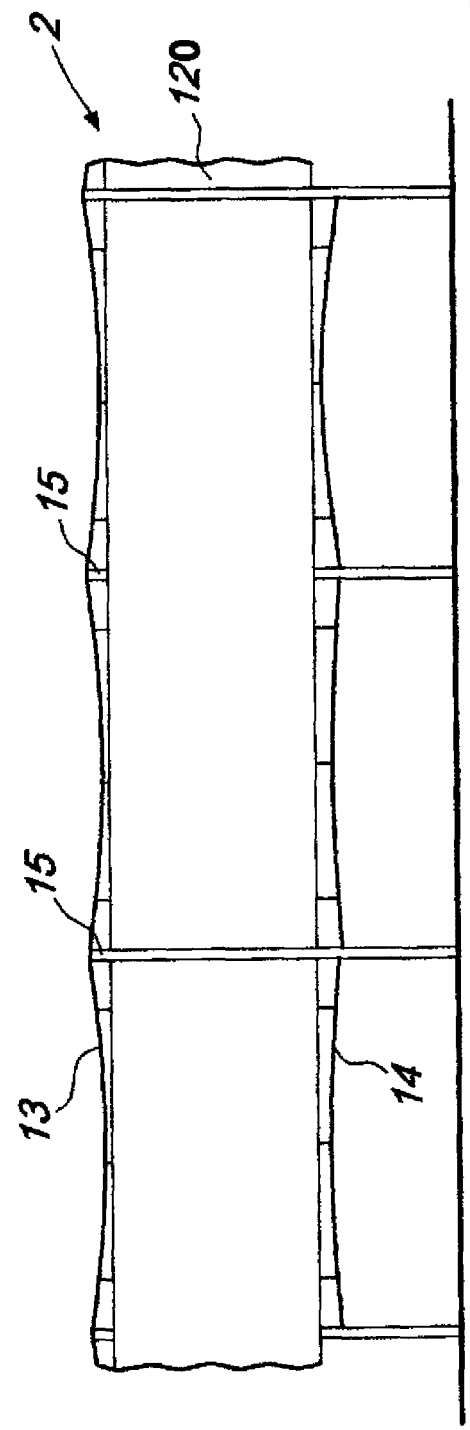

SOLAR RADIATOR

TECHNICAL FIELD

The present invention relates to a solar radiator suitable to collect, transmit and dissipate at least partially the energy of the solar radiation that strikes it, so as to control at least partially the effects of excessive solar irradiation and protect portions of soil related to areas at risk of drought or desertification and more.

BACKGROUND ART

As it is known, the conditions of the atmosphere and life on Earth depend critically on the amount of irradiation received from the sun. Solar radiation is transmitted by irradiation, which occurs by means of electromagnetic waves which penetrate easily to the innermost layers of the atmosphere. This application of energy helps to determine the characteristics of the climates on Earth and in particular even differences in temperature of a few degrees Celsius have a great effect on climate.

This amount of heat sometimes reaches values which not only affect considerably the environmental and climatic conditions but even interferes directly with plant and animal life and with human activities connected to it, for example agricultural activities in arid or desert-like regions.

In the building sector, in order to deal with the excessive amount of heat sometimes transmitted to buildings and structures, some attempts have been made over time to devise various insulation systems, the most effective of which are based on building ventilated roofs, walls and windows. According to this constructive solution, the primary walls that actually constitute the buildings and coverings receive the superimposed addition of other walls, which are arranged further outward and are separated so as to form air spaces which dissipate at least partly the heat generated by solar irradiation, or walls covered with insulating material are used, or sunshades are installed.

Unfortunately, such solutions affect only the sectors mentioned above, whereas little has been done to reduce the effect of excessive solar irradiation on crops and soils in general, in which the greatest effort has been put into enhancing irrigation systems. However, it should be noted that irrigation water normally contains a certain quantity of salts, which over time tend to accumulate in the soil and become toxic for plants; therefore, it would be convenient to avoid the abuse of irrigation water, at least in order to slow the accumulation of these salts in the soil.

DISCLOSURE OF THE INVENTION

The aim of the present invention is to solve at least partially the problems described above, by providing a solar radiator which, despite working passively, is capable of reducing the effects caused by excessive exposure of soils to the rays of the sun and of modifying accordingly the irradiation conditions, reducing their effects and making the areas protected by solar radiators more suitable for the spontaneous growth of plants and more.

Within this aim, an object of the invention is to provide a solar radiator which is more or less complex and is capable of reducing at least partially the effects of solar irradiation in order to prevent the excessive heating of portions of the soil and of the first meters of air related to said soil, contrasting the thawing of snow and ice in mountain or polar regions and contrasting, in dry and desert-like areas, the drying of the soil and its gradual desertification.

Another object of the invention is to provide a solar radiator which, in some situations, is capable of facilitating agricultural activities even in dry or desert-like areas.

Another object of the invention is to provide a solar radiator which is able to reduce the effects caused by periods of drought without consuming energy.

Another object of the invention is to provide a solar radiator which is capable of keeping in two alternative or partial shades for many hours of the day the portions of land between the two lines of solar energy dissipating panels, reducing the evaporation of the water or moisture contained in the soil and consequently contrasting its drying, facilitating the development of plants and facilitating agricultural activities.

Another object of the invention is to provide a solar radiator which is capable of applying a protective action against at least part of the harmful effects caused by the wind.

Another object of the invention is to provide a solar radiator which can be manufactured with materials which can be recycled and is advantageous also from an environmental standpoint.

This aim and these and other objects which will become better apparent hereinafter are achieved by a solar radiator, characterized in that it comprises at least one panel which in turn is composed of a device which is normally composed of two solar energy dissipating elements, said panel being adapted to collect transmit and disperse passively at least part of the energy of the solar radiation that strikes it.

These and others aims are achieved according to the appended claims.

BRIEF DESCRIPTION OF THE DRAWINGS

Further characteristics and advantages of the invention will become better apparent from the following detailed description of some preferred but non-limiting and not exclusive embodiments of a solar radiator according to the invention, illustrated by way of non-limiting example in the accompanying drawings, wherein:

FIG. 1 is a perspective view of an example of a solar energy dissipating panel 2 of the invention;

FIG. 2 is a partially sectional enlarged-scale side view of a portion of the panel of FIG. 1 and FIG. 15;

FIG. 3 is a perspective view of another embodiment of a reinforced solar energy dissipating element for the device of the panels;

FIG. 4 is a perspective view of a possible variation of the solar energy dissipation element used in panel 2;

FIG. 5 is a perspective view of an example of a solar radiator 1 made of two lines of panels according to the invention;

FIG. 10 is a front view before completion of the embodiment of FIG. 11 where, in FIG. 10, only one solar energy dissipating element has been fixed to supports 15, FIG. 11 is a front view of the embodiment of FIG. 10 after completion where the second solar energy dissipating element has been fixed to supports 15, supports 15 are located in between the two solar energy dissipating elements 121 and 122 forming an interspace 50;

FIG. 19 is a view of a panel composed of a device constituted by a solar energy dissipating element made of fabric.

FIG. 20 is a view of an alternative embodiment of the panel of FIG. 20 where the solar energy dissipating element 120 pass alternately from the front to the back of the supports 15.

WAYS OF CARRYING OUT THE INVENTION

Figure 6:
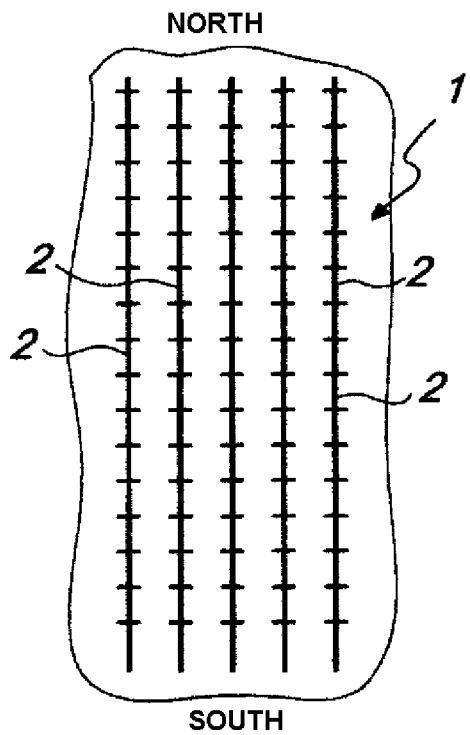
FIG. 6 is a plan view of a first embodiment of a solar radiator 1 made of 5 lines of panels according to the invention, in which the segments indicated by the arrows 2 schematically represent the panels 2.
Figure 7:
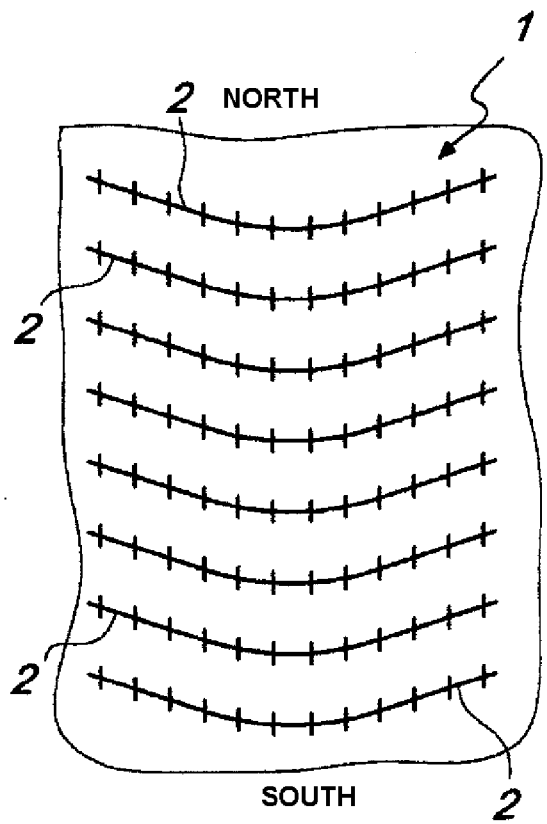
FIG. 7 is a plan view of a second example of embodiment of a solar radiator 1 made of 8 lines of panels according to the invention; in which the segments indicated by the arrows 2 schematically represent the panels 2.
Figure 8:
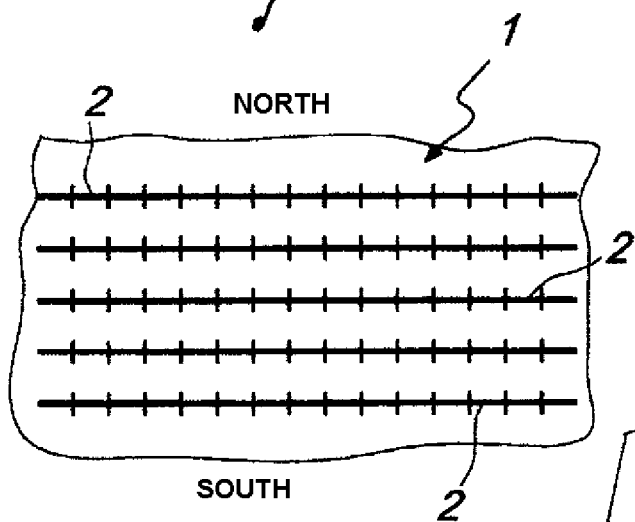
FIG. 8 is a plan view of a third example of an embodiment of a solar radiator 1 made of 5 lines of panels according to the invention; in which the segments indicated by the arrows 2 schematically represent the panels 2.
Figure 9:
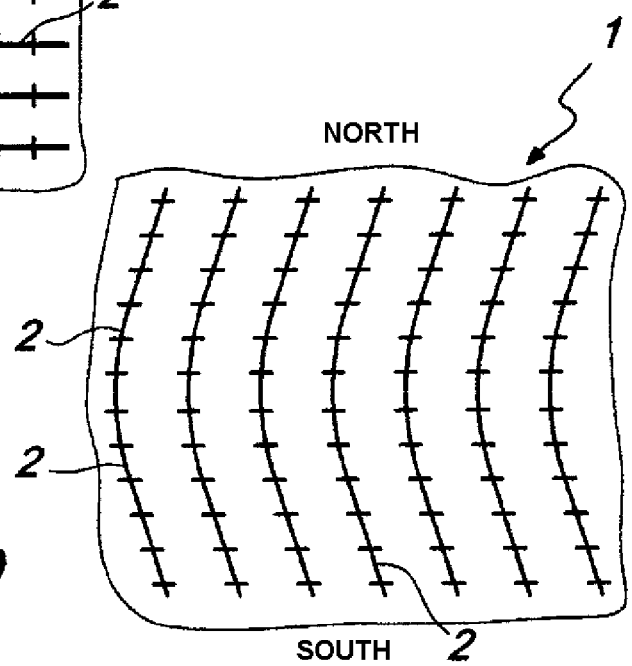
FIG. 9 is a plan view of a fourth example of embodiment of a solar radiator 1 made of 7 lines of panels 2 according to the invention; in which the segments indicated by the arrows 2 schematically represent the panels 2.

A panel 2 is always composed of supports 15 and at least one solar energy dissipation element forming a device in substantially upright position. A solar energy dissipation device is substantially composed of one 30, or one 120 solar energy dissipating element, or two 31 and 32, or two 121 and 122 solar energy dissipation elements.

Figure 13:
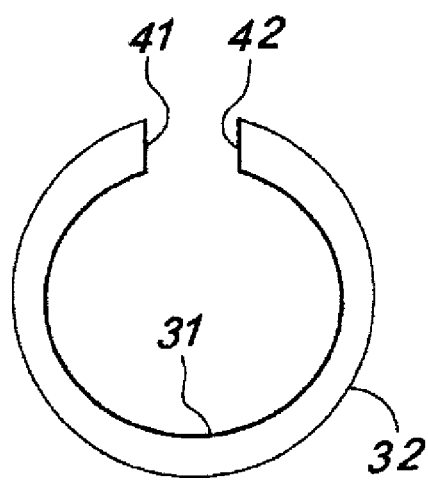
FIG. 13 is a plan view of a variation of the embodiment of FIG. 12 according to the invention, this type of panel can be used as a solar radiator made of one panel only.
Figure 14:
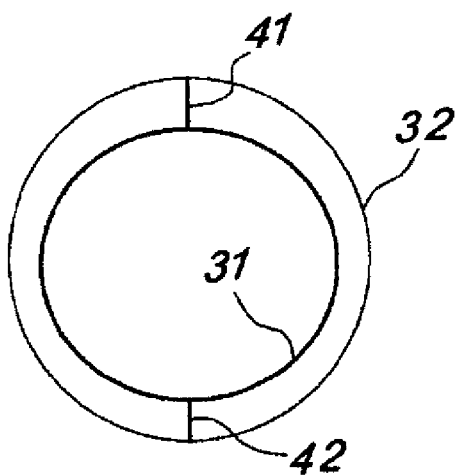
FIG. 14 is a plan view of another variation of the embodiment of FIG. 13 according to the invention, this type of panel can be used as a solar radiator made of one panel only.

With reference to the FIGS., a solar radiator, generally designated by the reference numeral 1, comprises, according to the invention, at least two parallel lines of panels 2, like the solar radiator 1 shown in FIG. 5, or made of more lines of panels 2 like in FIGS. 6, 7, 8, 9, or it can also be made like a round panels with supports 41 and 42 and two round solar energy dissipating elements 31 and 32, like those of FIGS. 13 and 14. A solar radiator is designed to: a) produce shades; b) collect part of the energy irradiated by the sun toward the ground to be protected; c) generate rising air streams; d) dissipate passively into the atmosphere at least said energy without using additional energy.

A solar radiator 1 is design to produce a double shade protection, morning and afternoon, for all corridors sheltered between the lines of panels 2; a solar radiator is a correct solution to reduce the soil's temperature, and to reduce evaporation of moister of the protected soil, all solar radiator 1 are also able to reduce plant's evapo-transpiration caused by direct sun rays and high air temperature.

An example, not limiting the way a solar radiator 1 is made, entails fixing the device to the supports 15. The device is composed of one 30 or one 120 solar energy dissipating element, or two solar energy dissipating elements 31 and 32 or two solar energy dissipating elements 121 and 122, each element could be a heat-conducting lamina, or be made of fabric, or made of any other type of material usable for the purpose. The solar energy dissipating elements are arranged substantially vertically so as to substantially face each other and are spaced by the lateral spacers 41 and 42, or supports 15 like in FIGS. 10 and 11, such spacers are interposed between the two solar energy dissipating elements 31 and 32 and are jointed at their lateral ends in order to form an interspace 50, or the solar energy dissipating elements 121 and 122 can be fixed directly on the supports 15. The fixing accessories are not mentioned in this description as there is an infinite list of them. Every panel 2 produces two shades and disperses solar energy. The panels 2, or the lines of panels 2, are arranged so as to substantially face each other in parallel rows. The solar energy dissipating elements, shown in FIG. 1, are joined at their lateral ends in order to form an interspace 50. The elements are coupled to a supporting frame, which by way of example shown in FIG. 1, is constituted by a simple pair of supports 81 and 82. The supports 81, 82 and 15 are driven into the ground supporting said devices substantially vertical determining the distance thereof from the ground allowing access of the air into the interspace 50. The supports also fix the direction of the devices in respect to the path of the apparent daily motion of the sun.

In particular, by reference to FIG. 1, the device made of two solar energy dissipating elements, which is made of the most convenient material, may consist of two heat-conducting laminas 31 and 32, which can be constituted for example by thin laminas made of metal or associated alloys or can be made of other materials suitable for the purpose to be achieved, have shapes which are not necessarily regular but substantially mutually coincident, while their dimensions and thickness may vary within such limits as to ensure the mechanical stability of the panel 2, allowing said panel to withstand for example the stresses due to atmospheric agents, such as for example the wind.

FIG. 2 illustrates the solar energy dissipation effects of-operation a panel 2 with a device composed of two elements, wherein the arrows inside the elements 31 and 32 represent the rising air flow within the interspace 50. The shade produced by the panel is shown to the right of the element 32. FIG. 2 does not show the flow of rising air to the left of the element 31 as it is a secondary flow which has a lower effect than the flow within the interspace 50.

FIG. 3 Shows a possible mechanical reinforcement applied to a solar energy dissipating element.

As the example shown in FIG. 4, the strength of the panel 2 can be increased by elements with a reinforcement border 6, which is joined to at least one portion of the edge of the element 30 so as to strengthen its structure, and it can also be strengthened by a mesh 7, which is joined to at least one portion of the element 30, or by an advantageous combination of the two reinforcements.

The mechanical strength of the panel 2 can be increased further by using an element with a horizontally corrugated surface, as shown in FIG. 3.

In the embodiment shown in FIGS. 10 and 11, the panel 2 takes the form of a structure composed, for example, of supports 15, cables and hooks and other accessories, in which the elements 31 and 32 can be constituted by thin laminas of metal or other heat-conducting materials, as described earlier, or by sheets of heat-conducting fabric 121 and 122, which are, for instance, joined at their upper ends to a first pair of overhead cables 13 and at their lower ends to a second pair of cables 14 which are connected to a supporting frame made of supports 15, which is formed for example by poles and the corresponding braces, which supports and stretches them. In the specific case, the elements 121 and 122, shown in FIGS. 10 and 11, can incorporate the supporting frames 15 or might be arranged laterally therein both on the same side, without incorporating them, by utilizing anchoring elements and spacers which are not shown in the accompanying FIGS.

Figure 12:
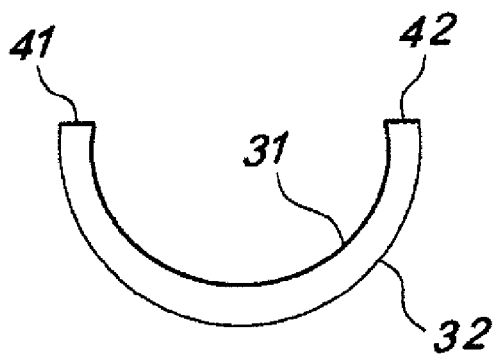
FIG. 12 is a plan view of another embodiment of another type of solar radiator which takes the shape of an independent round solar radiator panel.

In FIGS. 12, 13 and 14, the supports are not shown. Supports might be the same spacers 41 and 42, which, in case they work as supports, are vertically longer than the solar energy dissipating elements.

Figure 15:
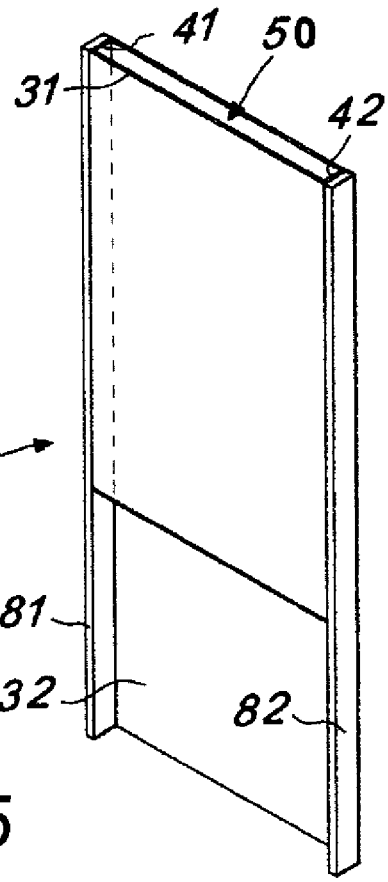
FIG. 15 is another embodiment of the panel 2 of the invention.

With FIG. 15, as an alternative, it is possible to provide the panel 2 by using two elements 31 and 32 with different heights, ensuring in any case access of the air to the interspace 50, as shown in the accompanying figures. It is optionally possible to fix to the ground the solar energy dissipating element with a greater height in order to make it more resistant.

Figure 16:
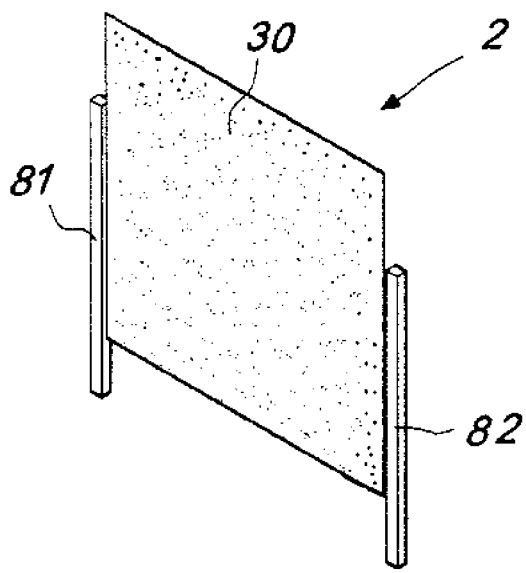
FIG. 16 is a view of a panel 2 with a device made of one solar energy dissipating element.

FIG. 16 is a view of the panel 2 with a device with one element 30 and supports 15, said element 30 can be a heat-conducting lamina.

Figure 17:
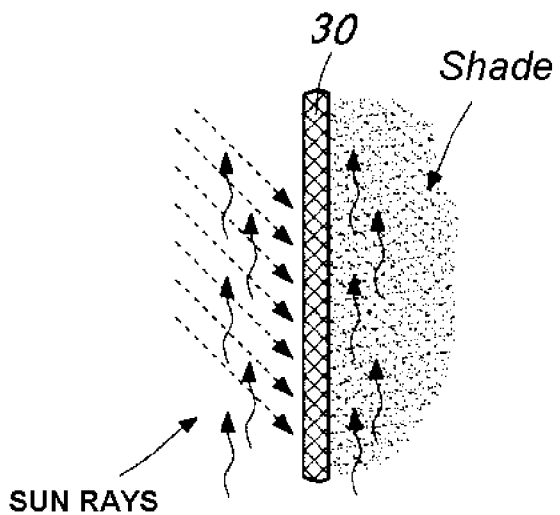
FIG. 17 is a partial lateral enlarged-scale sectional view of the embodiment of FIG. 16 which shows the effect of the impact of the solar energy in the solar energy dissipating element of panel of FIG. 16 made of a device which is made of a single solar energy dissipating element 30, the same effects happen on the solar energy dissipating elements of FIGS. 19 and 20.

FIG. 17 illustrates one of the effects of the operation of solar radiator 1 applied to the panel 2 with one solar energy dissipating element 30, where, due to the lack of the second element, the two rising air streams are practically identical and are shown in FIG. 17 by means of the vertical arrows. FIG. 17 does not show the effect of the contact of the two rising air streams with the air that surrounds the panel for the reasons that will be detailed during the explanation of FIG. 18.

Figure 18:
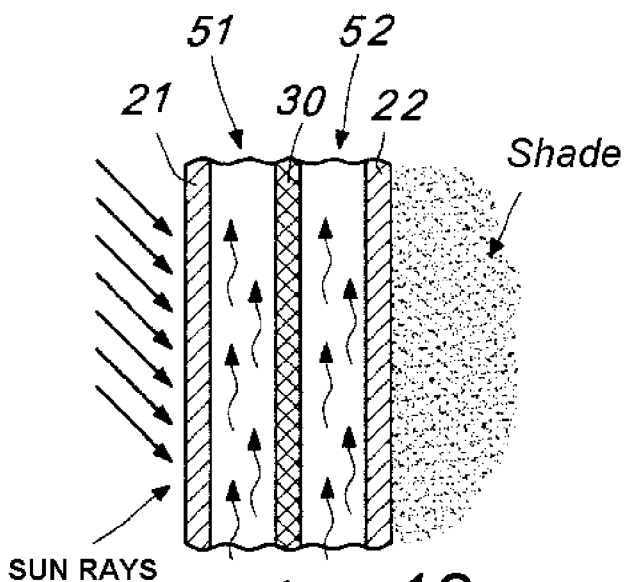
FIG. 18 is an enlarged-scale sectional side view of a variation of the device of FIG. 16 where 30 is the solar energy dissipating element of a single solar energy dissipating element panel 2 where 21 and 22 are two transparent laminas; this figure shows the effect of the impact of the solar energy on the device.

FIG. 18 illustrates the effects of operation of the solar radiator applied to a panel 2 with the device with one element 30 and two transparent laminas 21 and 22. This embodiment allows concentrating almost all of the energy that is collected by the element 30 in the two air streams that circulate in the interspaces 51 and 52, increasing considerably the efficiency of the panel 2.

FIG. 19 is a view of a panel composed of a device made of material like fabric. Such fabric is supported laterally with respect to the supporting frame by means of cables and corresponding accessories, the latter not being shown in the accompanying FIGS. As an alternative, the fabric can be fixed directly to the supports 15 by means of other accessories.

FIG. 20 is a view of a panel as in FIG. 19, with the difference that the device passes alternately from one side to the other of the supports 15.

The effectiveness of each panel 2 can be increased by means of several refinements, the first of which entails using lateral spacers which are trapezoidal so as to give the interspace 50 a truncated-pyramid shape. The convergence of the elements 31 and 32 toward their upper end causes the air that enters from the lower end of the interspace 50 to be forced, during its rising motion, to strike with greater pressure the surface of the elements 31 and 32, facilitating heat exchange considerably, these type of panels, with very large base, are good for a solar radiator 1 to protect land below foliage of date palm tree or others plantations.

Additional solutions aimed at adjusting energy absorption by the elements is carried out by covering elements externally or internally or on both sides with a desired light-absorbing layer, which is constituted, for example, by a film or a coat of dark and preferably matte paint.

Protection of each panel 2 against the action of natural electrical agents can be achieved by resorting, for example, the panels to a lightning protection or by using for example a cathode protection, or both, or another solution.

The environmental impact of the solar radiator 1 can be reduced from a visual standpoint by covering each panel 2 with a camouflage coloring which resembles the coloring of the surrounding environment, or from an environmental standpoint by providing each panel 2 by using recyclable materials, such as wood poles and metal laminas or others compatible materials.

Further embodiments of the panels, shown in the accompanying FIGS. 12, 13 and 14, entail giving the solar energy dissipating elements 31 and 32 an arc-like or even cylindrical shape. In the latter case, as an example, each panel may be composed of two elements made of heat-conducting laminas 31 and 32 which have a different radius of curvature, are mutually coaxial and are spaced by two lateral spacers 41 and 42 which are interposed between the two elements 31 and 32 and are joined at their lateral ends, or in diametrically opposite positions, so as to form internally the interspace 50, which allows the passage of the air stream generated due to solar irradiation; the supports are not detailed in the accompanying figures. These embodiments, which can be easily installed and subsequently removed, are for example, thanks to their shape, particularly useful to protect delimited areas in which particular crops are planted, such as for example young plants, in locations where there is insufficient water for irrigation and it is not convenient to use other protections.

The solar radiator 1, shown generally in FIGS. 6, 7, 8 and 9, comprises advantageously a structure constituted by parallel rows of panels 2, each row comprising a plurality of panels 2 whose number of panels 2 and lines of panel 2 can vary according to the extension of the surface to be protected. The solar radiator is positioned by arranging the panels 2 along substantially parallel rows and by installing them so that the elements 31 and 32 are arranged at a distance from the ground which is variable (where the term "variable" does not mean that the elements move up and down), such as to leave enough space to allow the natural circulation of the air within the interspace 50. It is obvious that in case the solar radiator is made of elements 120, 121, 122 and the elements were made of fabric they may be installed far from the ground, or the solar energy dissipating element can be installed with the bottom edge buried into the ground, like said before such installation is aimed to strength the panels. The rows composed of panels 2, which are arranged side by side forming corridors, and constituting a sort of long modular panels, must be spaced and oriented so that their faces are directed east/west or according to the effect to be obtained and can be substantially straight or slightly curved as in FIGS. 7 and 9.

Considering by way of non-limiting explanatory example the equatorial line and panels with two solar energy dissipating elements, the rows composed of the panels 2 generally must be positioned so that each panel 2 advantageously has its element 31 exposed to the east in order to collect the greatest quantity of solar rays in the morning and the element 32 exposed to the west in order to collect the greatest quantity of solar radiation in the afternoon, or vice versa. Of course, in the case of panels with a single element, the panels are installed so that the element is oriented with one face to the east and the other face to the west, respectively. Of course, the installation orientation of the panels 2 depends on the geographical location of the soil to be protected and can vary according to the seasons and to the path of the daily apparent motion of the sun or to the result to be obtained.

Working Principle.

The working principle of a solar radiator entitles the overlay of the two physical effects, the first not separable from the second one to which has to be considered as one only. The first effect of operation is related to double shades protecting the corridor inside a solar radiator 1, said protection is for reducing moister evaporation. The second effect of operation is related to collecting and scattering solar energy for climate influence.

The effects of operation mentioned above can also refers to FIG. 17, the rays of the sun strike the element 30, heating it; the element can be made of metal or other heat-conducting material or other material suitable for the purpose. The element must be oriented so that its faces collect the greatest quantity of solar radiation in the morning and afternoon. The rays of the sun produce a considerable heating of the element. The element cools due to the effect of the spontaneous air streams, as shown in detail in FIG. 17. The warm air streams rise due to their lower relative density. In this first step of the construction of a panel 2, one shade and two warm air streams are obtained as shown in detail in FIG. 18.

The operating principle entails increasing the efficiency of the panel with a single element by installing a second element as shown in the details given in FIGS. 1, 2 and 15. The interspace 50 allows the circulation of a natural cooling air stream that is delimited to it, said air arriving from the vicinity of the panel. The second element allows the circulation of the air stream in the interspace 50, avoiding the dispersion of the heat energy of said air stream with the rest of the air that circulates in the vicinity of the panel. Another possibility to increase the heat efficiency of the panel entails installing two transparent laminas which are coupled to the element as shown in FIG. 18, said transparent laminas being made of the most appropriate material. With this modification, the air streams generated within the interspaces 51 and 52, according to FIG. 18, do not dissipate the heat energy with the air that surrounds the panel. In this manner, at the output of the two interspaces 51 and 52 of the panel, as shown in FIG. 18, it is possible to obtain two streams of air which are warmer than the air on the edges of the lamina of the panel without transparent laminas. Other solutions to increase the efficiency of the panels have been described earlier. All the panels produce warm air. All the streams of warm air move spontaneously away from the ground, carrying to altitude the heat energy that they accumulated while they were in contact with the elements of the panel. All the warm air streams remove at least partially the excessive heat energy to disperse it at higher levels of the atmosphere.

In the case of panels with one or two interspaces the elements are installed at a suitable distance from the ground so as to allow air to enter the interspaces.

The solar energy dissipating elements and any accessories are installed, in respect to the ground, at the distance which depends on the results to be obtained.

While panels 2 shield the ground from the direct action of the sun, producing shaded corridors, the streams of rising warm air, in addition to drawing cooler air indeed from these adjacent shaded corridors, disperse in the atmosphere the heat accumulated by the elements moving it away from the ground.

In any case, the solar radiator 1 does not accumulate energy, cools spontaneously during the night, does not pollute and does not require additional energy to operate.

In practice it has been found that the solar radiator according to the invention fully achieves the intended aim and objects, since although being simple and relatively cheap to provide it ensures the possibility to reduce the effects of an excessive exposure of the corridors to solar radiation and to modify environmental conditions, slowing down the temperature of corridors that are under protection and slowing down the temperature of the first meters of the atmosphere that are adjacent to it, consequently reducing the melting of snow and ice in mountain or polar areas and in some cases supplying moisture, especially at night, due to the condensation of the moisture in the air, as is very likely for example in dry and desert-like areas.

Furthermore, the solar radiator according to the invention is able to reduce the effects of long periods of drought without consuming energy and is capable of keeping in the shade or partial shade for many hours important portions of the corridors where it is installed, reducing the evaporation of water, reducing the dehydration stress of plants, or reducing the evaporation of ground moisture, and consequently contrasting the drying of the ground.

The solar radiator thus conceived is susceptible of numerous modifications and variations, all of which are within the scope of the appended claims; all the details may further be replaced with other technically equivalent elements.

In practice, the materials employed, so long as they are compatible with the specific use, as well as the contingent shapes and dimensions, may be any according to requirements and to the state of the art.

The disclosures in Italian Patent Applications No. VI2005A000269 and No. VI2005A000293 from which this application claims priority are incorporated herein by reference.

The invention claimed is:

1. Solar Radiator (1) characterized in that it comprises at least two parallel, in a vertical orientation, and substantially upright lines of opaque solar energy dissipating panels (2) in order to form one or more corridors between the lines of panels, said corridors are open on top, where each of said panels (2) comprises supports (15) and a devise comprising at least one solar energy dissipating element said solar energy dissipating elements are fixed at supports (15), said device is able to dissipate solar energy into the air above the panels said supports (15) are stuck into the ground in order to keep the panels in the substantially upright position, said solar radiator (1), so conceived, is adapted to produce protective shades in the corridors while said solar energy dissipating elements collect and scatter at least part of the solar energy that strike them, said solar radiator (1) so conceived protects the corridors from high evaporation of moister in the soil and high plants' evapotranspiration.

2. Solar Radiator (1) according to claim 1 characterized in that said solar radiator (1) is made of a pluralities of parallel solar energy dissipating panels (2) forming at least a not straight corridor.

3. Solar Radiator (1) according to claim 1 characterized in that at least a long solar energy dissipating panel (2) substitute a line of solar energy dissipating panels (2) where said panel (2) takes the form of a long panel made of many supports (15) and at least a long solar energy dissipating element fixed at supports.

4. Solar Radiator (1) according to claim 1, characterized in that at least one of said lines of solar energy dissipating panels (2) has a panel with a device made of two solar energy dissipating elements (31, 32) and two spacers (41, 42) said device is fixed at supports (15).

5. Solar Radiator (1) according to claim 1, characterized in that at least one of said line of solar energy dissipating panels (2) has a device made of two solar energy dissipating elements (121 and 122), said solar energy dissipating elements are fixed to the supports (15) forming an interspace where said supports (15) are the spacers.

6. Solar Radiator (1), according to claim 1, characterized in that at least one panel (2) has the solar energy dissipating elements forming a truncated-pyramid.

7. Solar Radiator (1), according to claim 1, characterized in that at least one panel (2) comprises a transparent lamina, whose shape substantially coincide with the shape of said solar energy dissipating element, said transparent lamina facing said solar energy dissipating element at a distance which is determined by at least one pair of lateral spacer (41, 42) which are interposed between said transparent lamina and said solar energy dissipating elements and are joint at their lateral ends in order to form at least an interspace (50) between said transparent lamina and said solar energy dissipating element, where said interspace is open on top and on bottom in order to let air flowing through the interspace and dissipate solar energy into the air above the panels.

8. Solar Radiator (1) according to claim 1, characterized in that it comprises at least one solar energy dissipating element comprising a camouflage coloring which reproduces the landscape in order to reduce the visual environmental impact.

9. Solar Radiator (1) according claim 1, characterized in that at least one solar energy dissipating panel (2) comprises a plurality of metal solar energy dissipating element.

10. Solar Radiator (1) according claim 9, characterized in that at least one solar energy dissipating panel (2) comprises a metal solar energy dissipating element and a protection against electrical phenomena.

11. Solar Radiator (1) according to claim 1, characterized in that at least one of said solar energy dissipating panel (2) has a solar energy dissipating element with at least one mechanical reinforcement for at least one portion of said solar energy dissipating element, such reinforcement is used in order to give mechanical stability to said solar energy dissipating panel (2).

12. Solar Radiator (1), according to claim 11, characterized in that at least one of said solar energy dissipating panel (2) has a solar energy dissipating element comprises a light-absorbing layer.

13. Solar Radiator made of substantially coaxial and opaque solar energy dissipating elements, said elements are arranged mutually substantially coaxial where each element is in a substantially vertical orientation, said solar energy dissipating elements form an interspace between said solar energy dissipating elements, said interspace is open on top and on the bottom in order to let air enters the into the interspace and take away at least part of the solar energy and disperse said solar energy into the air above the solar radiator, where the supports are stuck into the ground in order to fix said solar radiator at the soil, said solar radiator, so conceived, is adapted to produce protective shade while said solar energy dissipating elements collect and scatter at least part of the solar energy that strike them, said solar radiator so conceived protects land where it is installed from high evaporation of moister in the soil and protect plants' from high evapotranspiration.

14. Coaxial Solar Radiator as per claim 13 characterized in that said solar energy dissipation elements comprise a color, which is superimposed to at least one portion of said solar energy dissipating elements.

15. Coaxial Solar Radiator as per claim 13 characterized in that one of said solar energy dissipating elements is stuck into the ground.

16. Coaxial Solar Radiator as per claim 13 characterized in that it comprises a lateral opening.

17. Coaxial Solar radiator according to claim 13, characterized in that said solar energy dissipating elements comprise camouflage coloring which reproduce the surrounding landscape in order to reduce the visual environmental impact.

\* \* \* \* \*